Nov. 14, 1939. K. KADEN Re. 21,263

SPRING AND METHOD OF MAKING THE SAME

Original Filed Jan. 15, 1932

INVENTOR.
KARL KADEN

BY Richards & Geier
ATTORNEYS

Reissued Nov. 14, 1939 Re. 21,263

UNITED STATES PATENT OFFICE 21,263

SPRING AND METHOD OF MAKING THE SAME

Karl Kaden, Frankenberg, Bez. Chemnitz, Germany, assignor to No-Sag Spring Company, a corporation of Michigan Original No. 2,002,399, dated May 21, 1935, Serial No. 586,838, January 15, 1932. Application for reissue February 8, 1938, Serial No. 189,380. In Germany April 16, 1931.

5 Claims. (Cl. 29—173)

This invention relates to flat springs and a method of making the same, and refers more particularly to sinuous flat springs and a method of stabilizing or preserving the resiliency of such springs.

Flat springs of the known type having a sinuous shape are used chiefly for the backs of seats, flat cushions, cushioned seats and the like and are usually bent upwards when used for this purpose. They are cheap to produce and of convenient low height when mounted, but, on the other hand, have the drawback that as soon as they are bent under the action of a load beyond their horizontal plane they are deflected still further by said load and fail to recover their initial position.

The invention eliminates this defect by imparting to the flat springs a rounded shape, preferably by passing them through a cylinder rolling mill. A flat spring treated according to the invention will not lose its resiliency even if it is bent through completely towards the side not facing its curvature.

One form of the invention is illustrated in the accompanying drawing, in which

Figure 1:
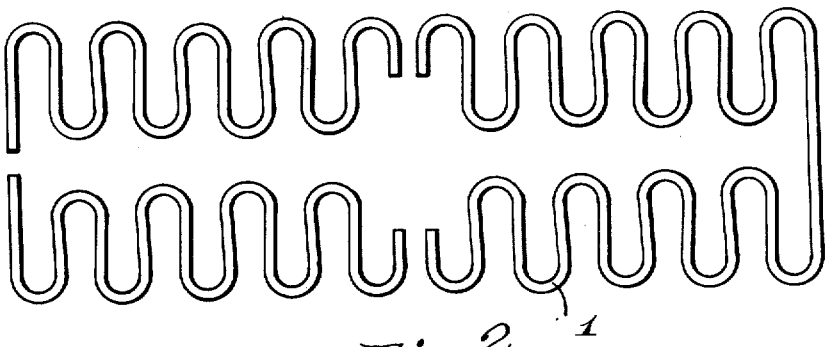
Figure 2:
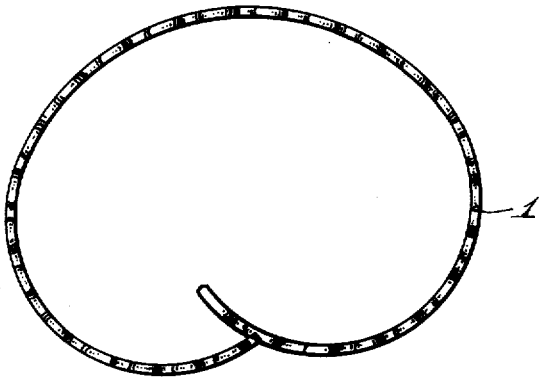
Figure 3:
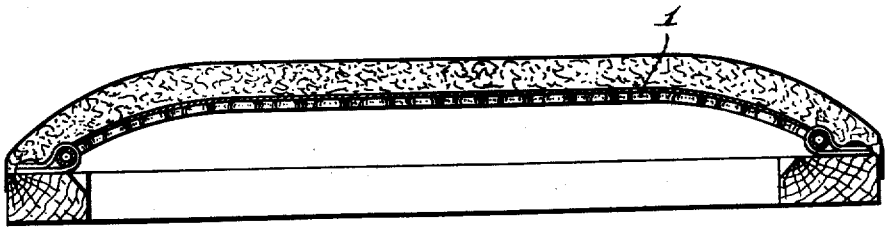

Figure 1 is a top view of a flat spring of the type described having two interconnected sinuous parts which are broken off in the middle;

Fig. 2, a side view of the same spring after the rolling step;

Fig. 3 shows by way of example a rolled sinuous spring used for supporting the seat of a chair.

Referring to the drawing: The flat spring 1, which in this case is of the double type though it might just as well be of the single kind, is made round by rolling and brought into the shape shown in Fig. 2, the rolling continuing until the desired radius of curvature is reached.

If a spring 1 is fastened on both ends when in use, as shown in Fig. 3, it automatically will arrange itself in the form of a curved plane and always return to its initial position even if fully bent through when exposed to a load.

It is advisable to employ a spring of a sinuous shape the turns of which extend parallel to one another, as shown in Fig. 1. The turns of a flat spring fixed on both ends will be pressed somewhat together when subjected to loads, and if the turns extend parallel to one another, a flat spring of this type with curved plane possesses already in its coils an inherent stability in addition to the degree of stability imparted to it by rolling. This is due to the fact that the parallel turns whose resiliency is still unimpaired offer a resistance of their own when loaded and thus assist in preventing the collapse of the spring.

What is claimed is:

1. The method of making a spring construction which includes, bending and permanently setting resilient stock to provide a sinuous spring element which when free and unsecured will lie along an arc which is greater than 180° and of materially smaller radius than the arc upon which the spring thus formed is ultimately disposed when mounted, spreading the ends of said spring element with respect to each other and attaching the ends of said spring element to a frame while so spread, whereby to tension said spring element to lie along an arc of materially greater radius than that on which it was initially set.

2. The method of making a spring construction including bending a section of stock to sinuous form whereby to provide a series of adjacent lateral convolutions, and setting the spring element thus formed to lie along an arc which is greater than 180° and which is of materially smaller radius than the arc upon which said spring element is intended to lie when mounted, spreading the ends of the spring element thus formed relative to each other and attaching the ends of said spring to a frame while so spread whereby to tension said spring element to lie along an arc of materially greater radius than that upon which it was initially set, with the spring having a substantial outward curvature in the direction from which a force is to be applied whereby said spring element will serve to offer material resistance against downward displacement as a result of loads imposed thereon, said attachment to said frame being such that inward movement of said spring toward said frame under said applied force with resultant decrease in curvature of said spring will not result in substantial spreading of the ends from each other and will result in said force being taken up in the body of the spring between the ends thereof by shortening of the spring and decrease in its curvature.

3. A spring construction comprising a frame, and a spring element, said spring element comprising a section of stock bent to sinuous form whereby to provide a series of adjacent lateral convolutions, said spring element being initially set whereby as a whole it will lie along an arc which is greater than 180° and of smaller radius than the arc upon which the same is disposed when ultimately used, the ends of said spring being attached to said frame whereby to tension said spring element along an arc of materially greater radius than the arc upon which it was initially set.

4. A spring construction comprising a frame, and a spring element secured thereto, said spring element comprising a section of spring wire sinuously preformed to provide a series of adjacent lateral convolutions. said spring element as a whole being preformed to set the same whereby said spring element when in unsecured position with its free end will lie along an arc greater than 180° and of materially smaller radius than the arc upon which it lies when ultimately mounted, said spring element having its ends attached to said frame to tension said spring element along an arc of materially greater radius than that upon which it was set, said attachment to said frame being such that inward movement of said spring toward said frame under said applied force with resultant decrease in curvature of said spring will not result in substantial spreading of the ends from each other and will result in said force being taken up in the body of the spring between the ends thereof by shortening of the spring and decrease in its curvature.

5. A spring construction comprising a frame, a plurality of spring elements spanning said frame, each comprising a section of stock bent to sinuous form to provide a series of adjacent lateral convolutions, said spring elements being initially set on an arc to provide resistance against downward deflection, the length of said elements being such relative to the width of a frame that the ends of said elements are drawn outwardly when attached thereto, means attaching the ends of said elements to said frame against movement longitudinally of their length and disposed on an arc of appreciable curvature of greater radius than said first arc out of the plane of the frame, the set therein being such that the elements return to the curvature of said arc of greater radius even though pressed below a plane through the attaching means a distance at least equal to said arc of greater radius.

KARL KADEN.

CERTIFICATE OF CORRECTION.

Reissue No. 21,263. November 14, 1939.

KARL KADEN.

It is hereby certified that error appears in the printed specification of the above numbered patent requiring correction as follows: Page 2, first column, line 11, for the words "free end" read ends free; and that the said Letters Patent should be read with this correction therein that the same may conform to the record of the case in the Patent Office.

Signed and sealed this 23rd day of January, A. D. 1940.

(Seal)

Henry Van Arsdale,
Acting Commissioner of Patents.